US007818728B1

(12) United States Patent
Olson

(10) Patent No.: US 7,818,728 B1
(45) Date of Patent: Oct. 19, 2010

(54) MAXIMIZING SYSTEM RESOURCES USED TO DECOMPRESS READ-ONLY COMPRESSED ANALYTIC DATA IN A RELATIONAL DATABASE TABLE

(75) Inventor: Jack Edward Olson, Austin, TX (US)

(73) Assignee: QD Technology LLC, Clifton, NJ (US)

( * ) Notice: Subject to any disclaimer, the term of this patent is extended or adjusted under 35 U.S.C. 154(b) by 526 days.

(21) Appl. No.: 11/395,003

(22) Filed: Mar. 31, 2006

Related U.S. Application Data

(60) Provisional application No. 60/668,322, filed on Apr. 4, 2005.

(51) Int. Cl.
*G06F 9/445* (2006.01)
(52) U.S. Cl. .................... 717/140; 717/174; 707/693
(58) Field of Classification Search ................ 717/136, 717/146, 159
See application file for complete search history.

(56) References Cited

U.S. PATENT DOCUMENTS

| | | | | |
|---|---|---|---|---|
| 4,905,146 | A * | 2/1990 | Barker et al. ................... 714/32 |
| 5,546,575 | A | 8/1996 | Potter et al. ................... 707/101 |
| 5,794,229 | A | 8/1998 | French et al. ................... 707/2 |
| 5,870,036 | A | 2/1999 | Franaszek et al. ............. 341/51 |
| 6,460,046 | B1 | 10/2002 | Meek ......................... 707/102 |
| 6,493,728 | B1 | 12/2002 | Berger ........................ 707/202 |
| 7,024,414 | B2 | 4/2006 | Sah et al. ..................... 707/101 |
| 2001/0047394 | A1* | 11/2001 | Kloba et al. ................. 709/217 |
| 2003/0090397 | A1 | 5/2003 | Rasmussen ................... 341/51 |
| 2003/0142960 | A1 | 7/2003 | Yokota et al. ................. 386/94 |
| 2004/0221021 | A1* | 11/2004 | Domer ....................... 709/219 |
| 2005/0192998 | A1 | 9/2005 | Dittrich et al. .............. 707/102 |
| 2006/0026582 | A1* | 2/2006 | Collard et al. ............... 717/161 |

OTHER PUBLICATIONS

Office Action for U.S. Appl. No. 11/395,709 with a mailing date of Apr. 4, 2008.
Guy Blelloch, Introduction to Data Compression, Oct. 2001, pp. 1, 2, 9 and 10.

* cited by examiner

*Primary Examiner*—Cam Y T Truong
(74) *Attorney, Agent, or Firm*—Robert A. Voigt, Jr.; Winstead PC

(57) ABSTRACT

A method, computer program product and system for minimizing system resources used to decompress read-only compressed analytic data in a relational database table. An i-code list associated with a relational database table is converted into a programming language. The programming language is compiled in object code and stored in a module in the user's system. The object code is called with a pointer designating the particular row in the database containing the compressed data to be decompressed. The compressed data designated by the pointer is decompressed upon execution of the object code. By having the source code for decompressing the compressed data stored as object code in the user's system, the interpretation step (as used in the i-code method) is avoiding thereby reducing the number of machine cycles used to decompress the compressed data. As a result, query programs will be able to access large amounts of data more quickly.

15 Claims, 4 Drawing Sheets

US 7,818,728 B1

MAXIMIZING SYSTEM RESOURCES USED TO DECOMPRESS READ-ONLY COMPRESSED ANALYTIC DATA IN A RELATIONAL DATABASE TABLE

CROSS REFERENCE TO RELATED APPLICATIONS

This application is related to the following commonly owned U.S. Patent Application:

Provisional Application Ser. No. 60/668,322, "Method for Creating and Executing Compiled Access Methods for Relational Data Tables and Indexes that Achieves High Performance Access Against Compressed Data and Indexes," filed Apr. 4, 2005, and claims the benefit of its earlier filing date under 35 U.S.C. §119(e).

TECHNICAL FIELD

The present invention relates to the field of data compression and decompression for databases, and more particularly to minimizing system resources used to decompress read-only compressed analytic data in a relational database table.

BACKGROUND INFORMATION

A database may refer to a collection of related records that is created and managed by what is commonly referred to as a database management system. One type of database is a "relational database." A relational database may refer to a database that maintains a set of separate, related files or tables, but combines data elements from the tables for queries and reports when required.

The present invention is directed to a relational database that stores a particular type of data, referred to herein as "analytic data." Analytic data may refer to data that is analyzed. For example, stock transaction data may be analyzed for trends such as the age group of the individuals engaged in stock transactions. In another example, insurance data may be analyzed to determine whether it is profitable to maintain particular individuals as customers. In another example, data may be analyzed for fraud.

Often the analytic data stored in a relational database is "compressed" in order to maximize the amount of data stored in a given amount of disk space. Data compression may refer to the process of encoding information using fewer bits than an unencoded representation (original format of the data) would use through use of specific encoding schemes. For example, an article could be encoded with fewer bits if we accept the convention that the word "compression" be encoded as "comp." Once the analytic data is compressed, the compressed analytic data may be "read-only." Read-only may refer to data that will not change after it is compressed. It is noted that when "compressed data" is used herein that "compressed data" refers to "compressed analytic data."

When a user desires to access the compressed data in the relational database, the compressed data needs to be "decompressed" in order to reverse the effects of data compression. Decompression may refer to the act of reversing the effects of data compression which restores the data to its original form prior to being compressed. In this manner, the user is able to retrieve the requested data in its original form.

The present invention is directed to a decompression approach that does not decompress the entire rows of compressed data in a relational database table at a single time. Instead, the present invention is directed to a decompression approach that selectively decompresses column data in relational data tables, such as decompressing the compressed data row by row and then column by column within each row as each row is needed by the relational query processor.

One such method ("commonly referred to as the "control block method") used in such a decompression approach involves a decompression program reading information from a data structure, commonly referred to as a "control block," associated with a particular table of the relational database. The control block may store algorithms and parameters used to identify the particular subroutines to call to decompress the data in the table. The decompression program may read column by column within a row. After reading a column, the decompression program may read the information in the control block to call the appropriate subroutine to decompress the data for that column. The same process is repeated for the other columns in the row. The control block method uses a small amount of code to decompress the compressed data. However, a drawback to using the control block method is an excessive number of computer cycles being used to decompress the compressed data resulting in poor performance for query programs that access large amounts of data.

Another method ("i-code method") for decompressing compressed data used in the decompression approach discussed above is to create a string of commands, stored in a list ("i-code list"), that perform the same functionality as the parameters in the control block. These string of commands are created for a particular table of the relational database which are used by the decompression program to uncompress the data for each row of the table, row by row and column by column within the row. The string of commands may be referred to herein as "i-code" or "p-code," which are pseudo-code, i.e., not machine executable code. The i-code may be built by an "i-code builder" which is executed by an "i-code interpreter." The i-code interpreter interprets each of the commands. That is, the i-code interpreter interprets each command, one at a time, and then executes the code in-line thereby avoiding the subroutine calls. In comparison to the control block method, many machine cycles are eliminated to uncompress data. It does, however, require more programming effort as an i-code builder and an i-code interpreter have to be built. Further, while the i-code method does reduce the number of machine cycles used to decompress compressed data, there is still improvement to be made. By further reducing the number of machine cycles used to decompress compressed data, query programs will be able to access large amounts of data more quickly.

Therefore, there is a need in the art for further reducing the system resources (e.g., machine cycles) used to decompress read-only analytic data in a relational database table.

SUMMARY

The problems outlined above may at least in part be solved in some embodiments by converting the i-code list associated with a relational database table into a programming language and then compiling the programming language into object code. The object code may then be stored in the user's system and executed to decompress the compressed rows of data stored in the relational database table. By having the source code for decompressing the compressed data in the relational database table stored as object code in the user's system, the interpretation step (as used in the i-code method) is avoided thereby reducing the number of machine cycles used to decompress the compressed data. As a result, query programs will be able to access large amounts of data more quickly.

In one embodiment of the present invention, a method for minimizing system resources used to decompress read-only compressed analytic data in a relational database table may comprise the step of generating an i-code list from a control block, where the control block stores information regarding compression algorithms used to compress data in the relational database table, where the control block further stores parameters used to decompress compressed data in the relational database table. The method may further comprise converting the i-code list associated with the relational database table into a programming language. The method may further comprise compiling the programming language into object code. The method may further comprise storing the object code in a module stored in an executable library in a user's system enabling the object code to be reused for all subsequent query accesses.

In another embodiment of the present invention, a method for minimizing system resources used to decompress read-only compressed analytic data in a relational database table may comprise the step of compiling a programming code for the relational database table on a load machine if there is a compiler installed on the load machine that is compatible with a compiler installed on a user's machine, where an i-code list associated with the relational database table is converted into the programming code. The method may further comprise compiling the programming code for the relational database table on the user's machine if there is not a compiler installed on the load machine that is compatible with the compiler installed on the user's machine and if the compiler installed on the user's machine is compatible with the programming code. The method may further comprise installing on the user's machine a first package, where the first package comprises compressed data for the relational database table. The first package may further comprise a control block for the relational database table, where the control block stores information regarding compression algorithms used to compress data in the relational database table, where the control block further stores algorithms and parameters used to decompress compressed data in the relational database table. The first package may further comprise the i-code list associated with the relational database table; the programming code; and the compiled programming code.

In another embodiment of the present invention, a method for minimizing system resources used to decompress read-only compressed analytic data in a relational database table may comprise the step of executing an i-code interpreter to execute an i-code list associated with the relational database table, where the i-code list is generated from a control block, where the control block stores information regarding compression algorithms used to compress data in the relational database table, where the control block further stores parameters used to decompress compressed data in the relational database table, where the i-code interpreter is executed to execute the i-code list if there is not a compiled programming code installed on a user's machine, where the compiled programming code is converted from the i-code list. The method may further comprise calling an operating system to load the compiled programming code if the compiled programming code is installed on the user's machine.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for minimizing system resources used to decompress read-only compressed analytic data in a relational database table. In one embodiment of the present invention, an i-code list associated with a relational database table is converted into a programming language. During an install procedure, the programming language is compiled into object code and stored in a module in the user's system. The object code may be called by all subsequent query processing with a pointer designating the particular row in the database containing the compressed data to be decompressed. The compressed data designated by the pointer may then be decompressed upon execution of the object code. By having the source code for decompressing the compressed data in the relational database table stored as object code in the user's system, the interpretation step (as used in the i-code method) is avoiding thereby reducing the number of machine cycles used to decompress the compressed data. As a result, query programs will be able to access large amounts of data more quickly.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
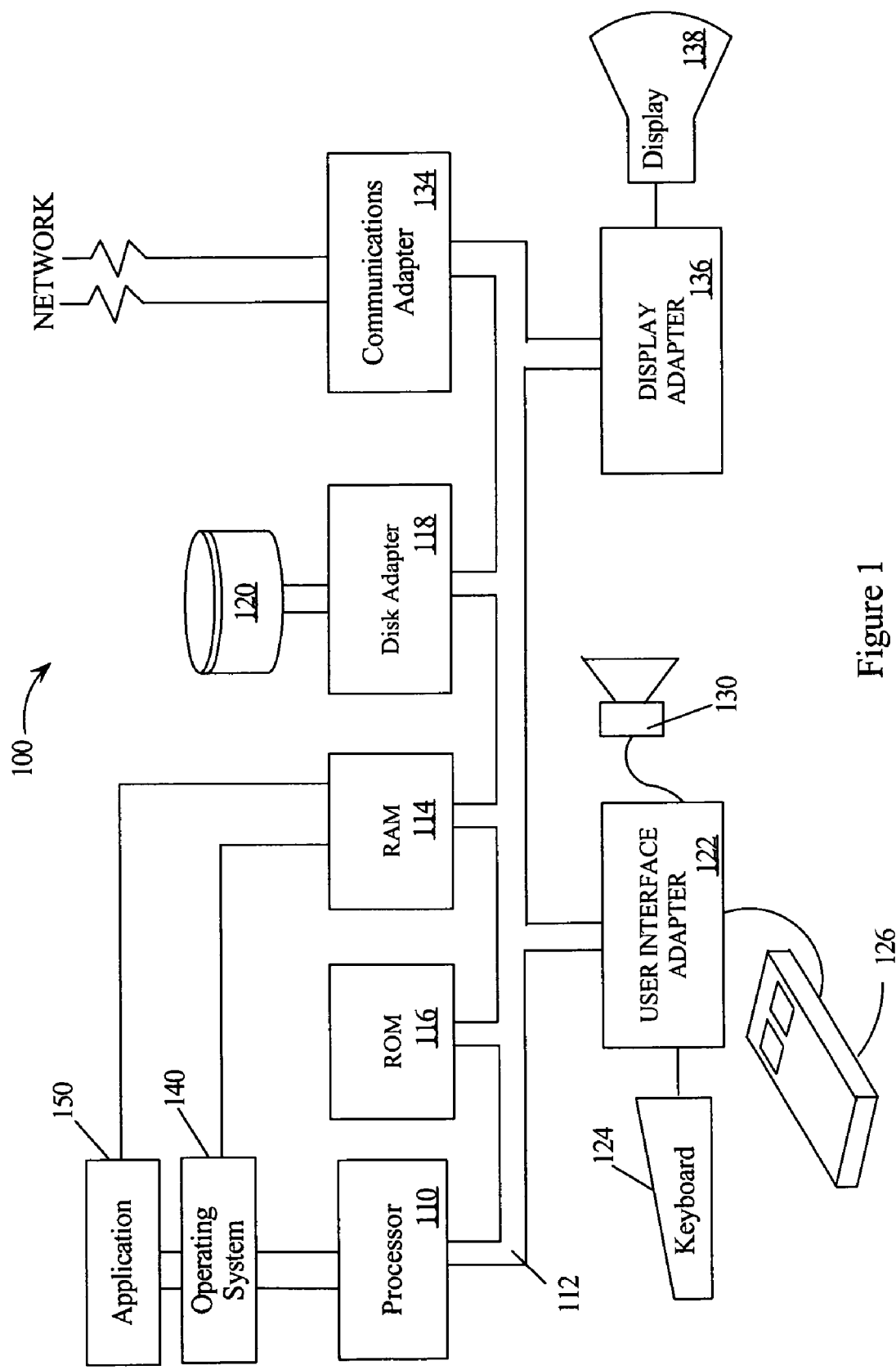
FIG. 1 is a hardware configuration of a computer system in accordance with an embodiment of the present invention.

FIG. 1—Computer System

FIG. 1 illustrates a typical hardware configuration of computer system 100 which is representative of a hardware environment for practicing the present invention. In particular, computer system 100 may represent a computer system, referred to herein as the "user's machine," or may represent a computer system, referred to herein as the "load machine."

"Load machine" may refer to a computer system that loads or installs software onto "user's machine."

Referring to FIG. 1, computer system 100 may have a processor 110 coupled to various other components by system bus 112. An operating system 140 may run on processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Application 150 may include, for example, an application for minimizing system resources used to decompress read-only compressed analytic data in a relational database table as described below in association with FIGS. 2-4. In particular, application 150 of either user's machine 100 or load machine 100 may include software to perform the "compiled method" as discussed below in connection with steps 201-204 of FIG. 2. Further, application 150 of user's machine 100 may include software ("uncompression software") configured to perform steps 205-206 of FIG. 2. Further application 150 of user's machine 100 may include the uncompression software configured to perform the uncompression of the compressed data in a relational database table as discussed further below in connection with FIG. 4. Further, application 150 of user's machine 100 may include software for performing the "package install process" as discussed further below in connection with FIG. 3.

Referring to FIG. 1, Read-Only Memory (ROM) 116 may be coupled to system bus 112 and include a basic input/output system ("BIOS") that controls certain basic functions of computer system 100. Random access memory (RAM) 114 and disk adapter 118 may also be coupled to system bus 112. It should be noted that software components including operating system 140 and application 150 may be loaded into RAM 114 which may be computer system's 100 main memory for execution. Disk adapter 118 may be an integrated drive electronics ("IDE") adapter that communicates with a disk unit 120, e.g., disk drive. It is noted that the software mentioned above may reside in either disk unit 120 or in application 150.

Referring to FIG. 1, computer system 100 may further comprise a communications adapter 134 coupled to bus 112. Communications adapter 134 may interconnect bus 112 with an outside network, e.g., Local Area Network (LAN), Wide Area Network (WAN), enabling computer system 100 to communicate with other such systems. I/O devices may also be connected to system bus 112 via a user interface adapter 122 and a display adapter 136. Keyboard 124, mouse 126 and speaker 130 may all be interconnected to bus 112 through user interface adapter 122. Data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 1238 or speaker 130.

Implementations of the invention include implementations as a computer system programmed to execute the method or methods described herein, and as a computer program product. According to the computer system implementations, sets of instructions for executing the method or methods may be resident in the random access memory 114 of one or more computer systems configured generally as described above. Until required by computer system 100, the set of instructions may be stored as a computer program product in another computer memory, for example, in disk unit 120. Furthermore, the computer program product may also be stored at another computer and transmitted when desired to the user's workstation by a network or by an external network such as the Internet.

As stated in the Background Information section, methods used in selectively decompressing column data in relational data tables, such as decompressing the compressed data row by row and then column by column within each row, use an excessive number of computer cycles to decompress the compressed data resulting in poor performance for query programs that access large amounts of data. By reducing the number of machine cycles used to decompress compressed data, query programs will be able to access large amounts of data more quickly. Therefore, there is a need in the art for further reducing the system resources (e.g., machine cycles) used to decompress read-only analytic data in a relational database table.

Figure 2:
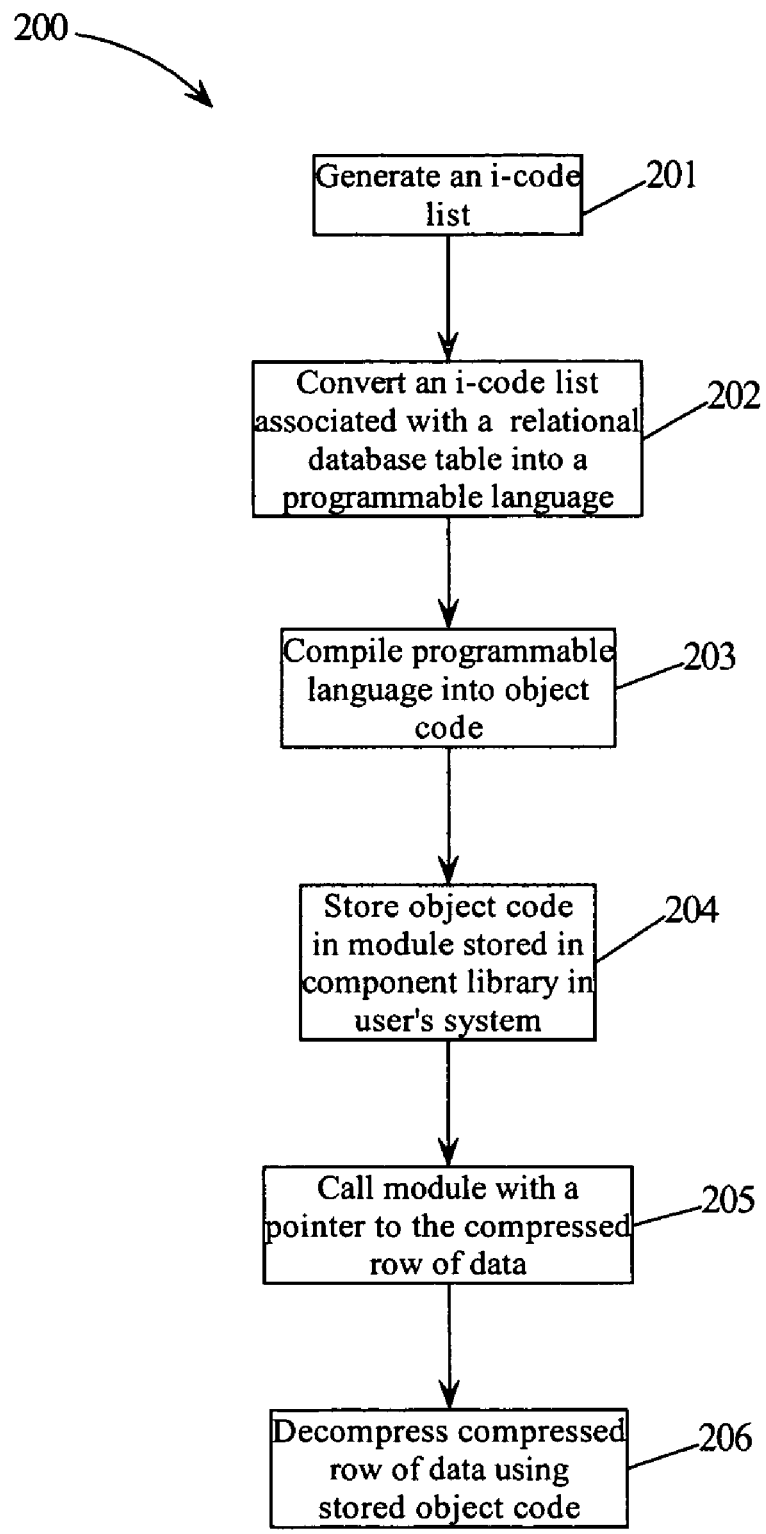
FIG. 2 is a flowchart of a method for decompressing read-only analytic data in a relational database table using the compiled method in accordance with an embodiment of the present invention.
Figure 3:
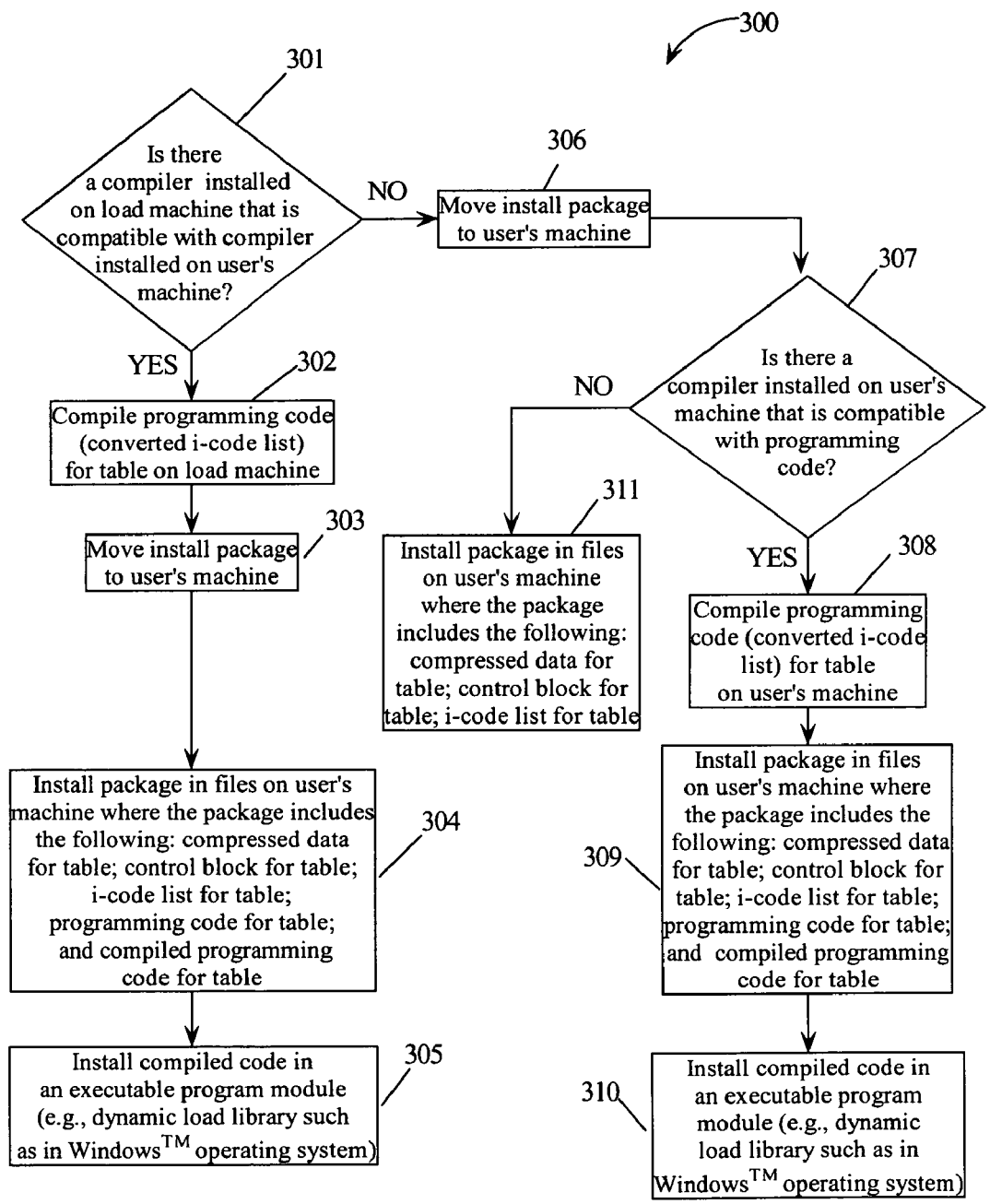
FIG. 3 is a flowchart of a method for installing a package on a user's machine which includes the necessary resources to decompress the compressed data in a relational database table in accordance with an embodiment of the present invention.
Figure 4:
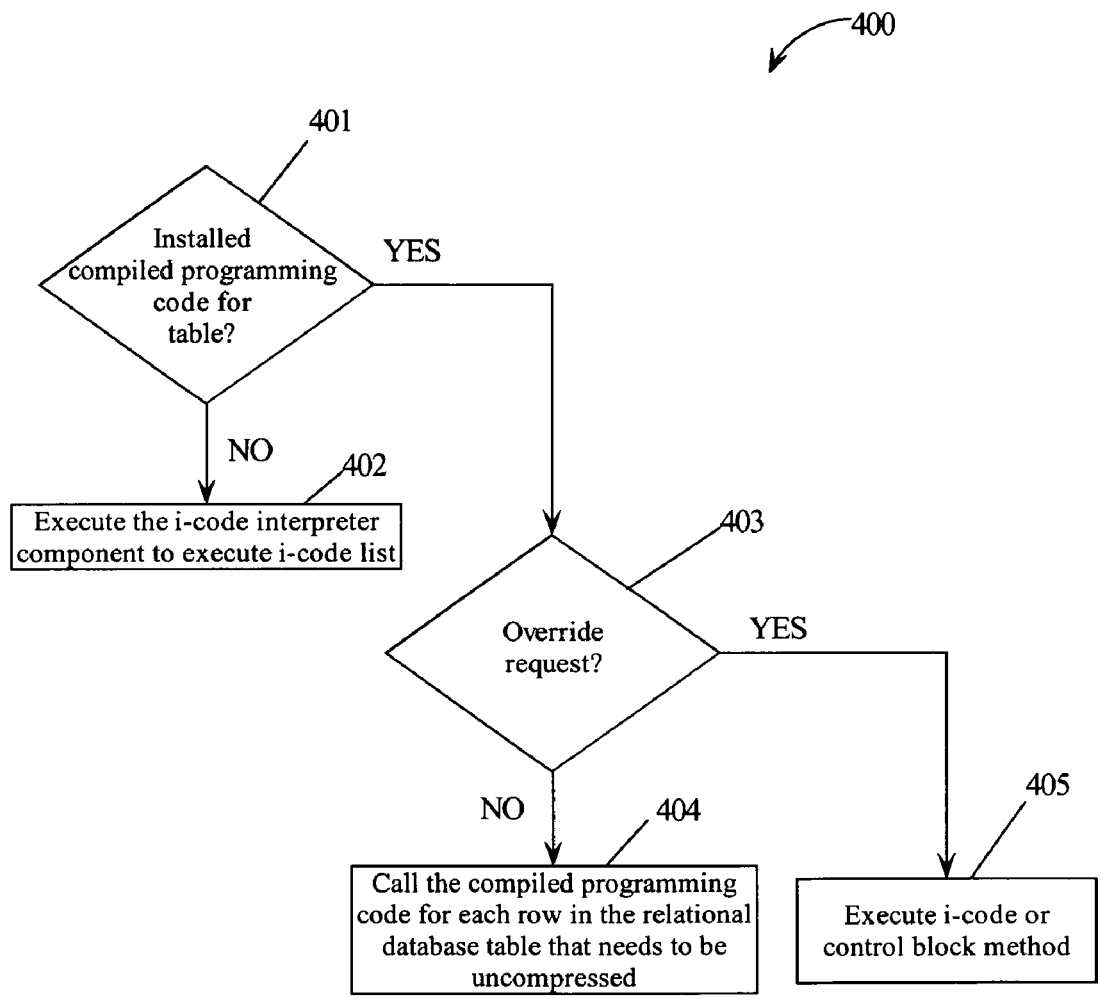
FIG. 4 is a flowchart of a method for performing the uncompression of the compressed data in a relational database table in accordance with an embodiment of the present invention.

Decompressing read-only analytic data in a relational database table using minimal system resource may be accomplished using the methods/processes discussed below in association with FIGS. 2-4. FIG. 2 is a flowchart of a method for decompressing read-only analytic data in a relational database table using a method referred to herein as the "compiled method." FIG. 3 is a flowchart of a method for installing a package on user's machine 100 which includes the necessary resources to decompress the compressed data in a relational database table. FIG. 4 is a flowchart of a method for performing the uncompression of the compressed data in a relational database table.

FIG. 2—Method for Decompressing Read-Only Analytic Data in a Relational Database Table Using the Compiled Method FIG. 2 is a flowchart of a method 200, referred to herein as the "compiled method," for decompressing read-only analytic data in a relational database table in accordance with an embodiment of the present invention.

Referring to FIG. 2, in connection with FIG. 1, in step 201, application 150 of either user's machine 100 or load machine 100 generates an i-code list from a control block. A control block may refer to a data structure that stores information regarding the compression algorithms used to compress the analytic data in the relational database table as well as includes parameters used to decompress the compressed data in the relational database table. Additional details regarding the control block are disclosed in U.S. patent application Ser. No. 11/395,709 filed on Mar. 31, 2006, entitled "Selecting Various Algorithms to Compress Columns of Analytic Data in a Read-Only Relational Database in a Manner that Allows Decompression of the Compressed Data Using Minimal System Resources,", which is hereby incorporated herein by reference in its entirety. The i-code list may refer to a list of commands or a string of commands (referred to herein as "i-code") that are used by a decompression or uncompression program to uncompress the data for each row of the table, row by row and column by column within the row. In one embodiment, the control block and the generated i-code list may reside in disk unit 120. In another embodiment, the control block and the generated i-code list may reside in a library (stored in RAM 114) in system 100.

In step 202, application 150 (running on user's machine 100 in one embodiment or running on load machine 100 in another embodiment) converts the i-code list associated with a relational database table into a programming language, e.g., C programming language. In step 203, application 150 compiles the programming language into object code, i.e., machine code.

In step 204, application 150 stores the object code in a module, which is stored in a executable library in user's system 100, thereby enabling the object code to be reused for all subsequent query accesses. In one embodiment, the module resides in RAM 114.

In one embodiment, application 150 resides in user's machine 100 and executes all of the procedures of method 200. In another embodiment, application 150 resides in a separate machine, referred to herein as the "load machine" 100, and executes only the i-code generation, c-code generation and c-code compile steps (steps 201-204).

In step 205, uncompression program 150 of user's machine 100 calls the module which stores the object code with a pointer to the compressed row of data. That is, uncompression program 150 of user's machine 100 calls the module that stores the object code, where the call includes a pointer to the compressed row of data to be decompressed.

In step 206, uncompression program 150 of user's machine 100 decompresses the compressed row of data (compressed row of data that was identified by the pointer) using the stored object code.

In this manner, uncompression program 150 simply issues calls to the module as uncompression program 150 decompresses each row in the relational database table, column by column, without interpreting commands as in the i-code method. By having the source code for decompressing the compressed data in the relational database table stored as object code in the user's machine, the interpretation step (as used in the i-code method) is avoiding thereby reducing the number of machine cycles used to decompress the compressed data. As a result, query programs will be able to access large amounts of data more quickly.

It is noted that method 200 may include other and/or additional steps that, for clarity, are not depicted. It is further noted that method 200 may be executed in a different order presented and that the order presented in the discussion of FIG. 2 is illustrative. It is further noted that certain steps in method 200 may be executed in a substantially simultaneous manner.

The amount of system resources used in decompressing read-only analytic data in a relational database table may also be reduced by installing a package on user's machine 100, where the package includes the necessary resources to decompress the compressed data in the relational database table, as discussed below in association with FIG. 3. The package is a data object generated on load machine 100 that is move to user's machine 100 for installation.

FIG. 3—Method for Installing a Package on a User's Machine which Includes the Necessary Resources to Decompress the Compressed Data in a Relational DataBase Table FIG. 3 is a flowchart of a method 300 for installing a package on a user's machine 100 (FIG. 1), which includes the necessary resources to decompress the compressed data in a relational database table, in accordance with an embodiment of the present invention.

Referring to FIG. 3, in connection with FIG. 1, in step 301, application 150 of user's system 100 determines if there is a compiler (e.g., C compiler) installed on load machine 100 (e.g., computer system operating with Unix™ operating system) that is compatible with the compiler (e.g., C compiler) installed on user's machine 100 (e.g., computer system operating with Windows™ operating system). Load machine 100 may refer to a computer system that loads or installs software onto user's machine 100. User's machine 100 may refer to a computer system where an uncompression program operating on user's machine 100 decompresses the compressed data from the relational database table.

If there is a compiler in load machine 100 that is compatible with the compiler in user's machine 100, then, in step 302, application 150 compiles the programming code for the relational database table on load machine 100. That is, if there is a compiler in load machine 100 that is compatible with the compiler in user's machine 100, then application 150 compiles the programming code which is converted from an i-code list as discussed above in step 202 of FIG. 2. The programming code is compiled on load machine 100 using the compiler that is compatible with the compiler on user's machine 100.

In step 303, application 150 moves the install package to user's machine 100.

In step 304, application 150 installs the package in files on user's machine 100 where the package includes the following: compressed data for the relational database table; control block for the relational database table; i-code list for the relational database table; programming code for the relational database table; and the compiled programming code for the relational database table.

In step 305, application 150 installs the compiled code in an executable program module (e.g., dynamic load library such as in Windows™ operating system). By installing such a package on user's machine 100, uncompression program 150 simply issues calls to the compiled programming code (as discussed above in step 205 of method 200) as uncompression program 150 decompresses each row in the relational database table, column by column, and then proceeds to the next row. By having the source code for decompressing the compressed data in the relational database table stored as object code in user's machine 100, the interpretation step (as used in the i-code method) is avoiding thereby reducing the number of machine cycles used to decompress the compressed data. As a result, query programs will be able to access large amounts of data more quickly.

If, however, there is not a compiler in load machine 100 that is compatible with the compiler in user's machine 100, then, in step 306, application 150 moves the install package to user's machine 100.

In step 307, application 150 determines if there is a compiler installed on user's machine 100 that is compatible with the programming code. For example, if the programming code is written in C, then, application 150 may determine if there is a C compiler installed on user's machine 100.

If there is a compiler in user's machine 100 that is compatible with the programming code, then, in step 308, application 150 compiles the programming code for the relational database table on user's machine 100. That is, if there is a compiler in user's machine 100 that is compatible with the programming code, then application 150 compiles the programming code which is converted from an i-code list as discussed above in step 202 of FIG. 2.

In step 309, application 150 installs the package in files on user's machine 100 where the package includes the following: compressed data for the relational database table; control block for the relational database table; i-code list for the relational database table; programming code for the relational database table; and the compiled programming code for the relational database table.

In step 310, application 150 installs the compiled code in an executable program module (e.g., dynamic load library such as in Windows™ operating system). By installing such a package on user's machine 100, uncompression program 150 simply issues calls to the compiled programming code (as discussed above in step 205 of method 200) as uncompression program 150 decompresses each row in the relational database table, column by column, and then proceeds to the next row. By having the source code for decompressing the compressed data in the relational database table stored as object code in user's machine 100, the number of machine cycles used to decompress the compressed data is further reduced in relation to the methods discussed in the Background Information section. As a result, query programs will be able to access large amounts of data more quickly.

If, however, there is not a compiler in user's machine 100 that is compatible with the programming code, then, in step 311, application 150 installs a package in files (e.g., stored on disk unit 120) on user's machine 100 where the package includes the following: compressed data for the relational database table; control block for the relational database table; and the i-code list for the relational database table. In this manner, an i-code interpreter stored on user's machine 100 (such as on disk unit 120) can decompress the compressed data in the relational database table by executing the i-code list (string of commands) as the uncompression program decompresses the compressed data for each row of the relational database table, row by row and column by column within the row.

It is noted that method 300 may include other and/or additional steps that, for clarity, are not depicted. It is further noted that method 300 may be executed in a different order presented and that the order presented in the discussion of FIG. 3 is illustrative. It is further noted that certain steps in method 300 may be executed in a substantially simultaneous manner.

The uncompression program may perform the decompression of the compressed data in the relational database table in connection with the installed package (discussed above in connection with FIG. 3) as discussed below in connection with FIG. 4.

FIG. 4—Method for Performing the Uncompression of the Compressed Data in a Relational Database Table FIG. 4 is a flowchart of a method 400 for performing the uncompression of the compressed data in a relational database table in accordance with an embodiment of the present invention.

Referring to FIG. 4, in conjunction with FIGS. 1-3, in step 401, uncompression program 150 determines if there exists an installed compiled programming code in user's machine 100 that is associated with a relational database table. An installed compiled programming code may be installed on user's machine 100 as indicated in steps 303 or 306 of method 300.

If there does not exist an installed compiled programming code in user's machine 100 that is associated with a relational database table, then, in step 402, uncompression program 150 executes the i-code interpreter component to execute the i-code list. As discussed in method 300, the package installed on user's machine 100 may not include compiled programming code but instead include an i-code list as indicated in step 307. The package may not include compiled programming code if there is not a compiler installed on user's machine 100 that is compatible with the programming code. As a result, uncompression program 150 may execute the i-code list by executing the i-code interpreter which may be part of uncompression program 150. In one embodiment, the i-code interpreter may reside in disk unit 120.

If, however, there does exist an installed compiled programming code in user's machine 100 that is associated with a relational database table, then, in step 403, uncompression program 150 determines if there is an override request included in the query request. An override request may refer to a request to not execute the compiled programming code but instead execute either the i-code list or implement the control block method, as discussed above, such as for testing purposes. That is, an override request may refer to a request to either execute the i-code list or implement the control block method, as discussed above, as a fallback or diagnostic mode of processing.

If there is not an override request, then, in step 404, uncompression program 150 calls the compiled programming code for each row in the relational database table that needs to be uncompressed, row by row. In this manner, as explained above, the compressed data in the relational database table becomes decompressed as needed.

If, however, there is an override request, then, in step 405, uncompression program 150 either executes the i-code method or the control block method discussed above in the Background Information section. The package installed on user's machine 100 includes both the control block for the relational database table as well as the i-code list for the relational database table as discussed above in connection with steps 303, 306 and 307 in method 300.

It is noted that method 400 may include other and/or additional steps that, for clarity, are not depicted. It is further noted that method 400 may be executed in a different order presented and that the order presented in the discussion of FIG. 4 is illustrative. It is further noted that certain steps in method 400 may be executed in a substantially simultaneous manner.

Although the method, computer program product and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for minimizing system resources used to decompress read-only compressed analytic data comprising the steps of:

compiling a programming code for a relational database table on a load machine if there is a compiler installed on said load machine that is compatible with a compiler installed on a user's machine, wherein an i-code list associated with said relational database table is converted into said programming code;

compiling said programming code for said relational database table on said user's machine if there is not a compiler installed on said load machine that is compatible with said compiler installed on said user's machine and if said compiler installed on said user's machine is compatible with said programming code; and installing on said user's machine a first package, wherein said first package comprises:
    compressed data for said relational database table;
    a control block for said relational database table, wherein said control block stores information regarding compression algorithms used to compress data in said relational database table, wherein said control block further stores algorithms and parameters used to decompress compressed data in said relational database table;
    said i-code list associated with said relational database table;
    said programming code; and
    said compiled programming code.

2. The method as recited in claim 1 further comprising the step of:

installing on said user's machine a second package if there is not a compiler installed on said load machine that is compatible with said compiler installed on said user's machine and if there is not a compiler installed on said user's machine that is compatible with said programming code, wherein said second package comprises:

compressed data for said relational database table;

said control block for said relational database table, wherein said control block stores information regarding compression algorithms used to compress data in said relational database table, wherein said control block further stores parameters used to decompress compressed data in said relational database table; and said i-code list associated with said relational database table.

3. The method as recited in claim 2, wherein said second package is installed in a file.

4. The method as recited in claim 1, wherein said first package is installed in a file, wherein said compiled programming code is further installed in an executable program library.

5. The method as recited in claim 4, wherein said executable program library comprises a dynamic load library.

6. A computer program product embodied in a computer readable storage medium for minimizing system resources used to decompress read-only compressed analytic data comprising the programming steps of:

compiling a programming code for a relational database table on a load machine if there is a compiler installed on said load machine that is compatible with a compiler installed on a user's machine, wherein an i-code list associated with said relational database table is converted into said programming code;

compiling said programming code for said relational database table on said user's machine if there is not a compiler installed on said load machine that is compatible with said compiler installed on said user's machine and if said compiler installed on said user's machine is compatible with said programming code; and installing on said user's machine a first package, wherein said first package comprises:

compressed data for said relational database table;

a control block for said relational database table, wherein said control block stores information regarding compression algorithms used to compress data in said relational database table, wherein said control block further stores algorithms and parameters used to decompress compressed data in said relational database table;

said i-code list associated with said relational database table;

said programming code; and said compiled programming code.

7. The computer program product as recited in claim 6 further comprising the programming step of:

installing on said user's machine a second package if there is not a compiler installed on said load machine that is compatible with said compiler installed on said user's machine and if there is not a compiler installed on said user's machine that is compatible with said programming code, wherein said second package comprises:

compressed data for said relational database table;

said control block for said relational database table, wherein said control block stores information regarding compression algorithms used to compress data in said relational database table, wherein said control block further stores parameters used to decompress compressed data in said relational database table; and said i-code list associated with said relational database table.

8. The computer program product as recited in claim 7, wherein said second package is installed in a file.

9. The computer program product as recited in claim 6, wherein said first package is installed in a file, wherein said compiled programming code is further installed in an executable program library.

10. The computer program product as recited in claim 9, wherein said executable program library comprises a dynamic load library.

11. A system, comprising:

a memory unit for storing a computer program operable for minimizing system resources used to decompress read-only compressed analytic data; and a processor coupled to said memory unit, wherein said processor, responsive to said computer program, comprises:

circuitry for compiling a programming code for a relational database table on a load machine if there is a compiler installed on said load machine that is compatible with a compiler installed on a user's machine, wherein an i-code list associated with said relational database table is converted into said programming code;

circuitry for compiling said programming code for said relational database table on said user's machine if there is not a compiler installed on said load machine that is compatible with said compiler installed on said user's machine and if said compiler installed on said user's machine is compatible with said programming code; and circuitry for installing on said user's machine a first package, wherein said first package comprises:

compressed data for said relational database table;

a control block for said relational database table, wherein said control block stores information regarding compression algorithms used to compress data in said relational database table, wherein said control block further stores algorithms and parameters used to decompress compressed data in said relational database table;

said i-code list associated with said relational database table;

said programming code; and said compiled programming code.

12. The system as recited in claim 11, wherein said processor further comprises:

circuitry for installing on said user's machine a second package if there is not a compiler installed on said load machine that is compatible with said compiler installed on said user's machine and if there is not a compiler installed on said user's machine that is compatible with said programming code, wherein said second package comprises:

compressed data for said relational database table;

said control block for said relational database table, wherein said control block stores information regarding compression algorithms used to compress data in said relational database table, wherein said control block further stores parameters used to decompress compressed data in said relational database table; and said i-code list associated with said relational database table.

13. The system as recited in claim 12, wherein said second package is installed in a file.

14. The system as recited in claim 11, wherein said first package is installed in a file, wherein said compiled programming code is further installed in an executable program library.

15. The system as recited in claim 14, wherein said executable program library comprises a dynamic load library.

* * * * *